Oct. 27, 1964     R. M. VOITIK     3,154,309

ROTARY SEAL

Filed May 31, 1961

INVENTOR.
Robert M. Voitik,
BY Wolfe, Hubbard, Voit & Osann
Attorneys.

United States Patent Office 3,154,309
Patented Oct. 27, 1964

3,154,309
ROTARY SEAL
Robert M. Voitik, Evanston, Ill., assignor to Continental Illinois National Bank and Trust Company
Filed May 31, 1961, Ser. No. 113,826
4 Claims. (Cl. 277—35)

The present invention relates generally to gas and fluid sealing devices and more particularly concerns a rotary seal for restricting leakage along a rotating shaft.

The primary aim of the present invention is to provide an improved rotary seal that is exceptionally economical to manufacture and maintain while being efficient in operation.

More specifically, it is an object of the invention to provide an improved rotary seal having very few parts of simple design which can be easily assembled and serviced.

It is also an object to provide a rotary seal as characterized above which is quite compact.

Other objects and advantages of the invention will become apparent upon reading the following detailed description and upon reference to the drawings, in which.

While the invention will be described in connection with certain preferred embodiments, it will be understood that I do not intend to limit the invention to those embodiments. On the contrary, I intend to cover all alternatives, modifications and equivalents as may be included within the spirit and scope of the invention as defined by the appended claims.

Figure 1:
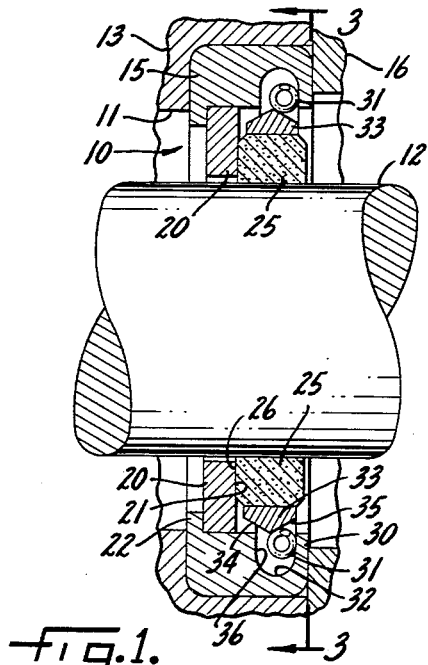
FIGURE 1 is a longitudinal section of a shaft assembly including a rotary seal embodying the present invention.

Turning first to FIG. 1, there is shown a shaft assembly including a rotary seal 10 constructed in accordance with the present invention and arranged to restrict gas and fluid leakage through an opening 11 defined by the space between a rotatable shaft 12 and a housing 13. The seal 10 includes an annular housing cup 15 which is snugly mounted within a recess in the housing 13 and is secured in place by a clamp plate 16.

The sealing elements of the seal 10 include a stator wall in the cup 15 formed by a stator 20 which defines an annular wall surface 21 that closely surrounds the shaft 12 and is disposed in a plane substantially perpendicular to the axis of the shaft 12. In the preferred construction, the stator 20 is sealed in the cup 15 against a shoulder 22 formed integrally with the cup. Cooperating with the stator 20 is a sealing ring 25 fitted on the shaft 12 within the cup 15 and having an annular surface 26 in abutment with the stator surface 21. Preferably, the sealing ring 25 is formed as a continuous annulus of carbon. There is sealing contact between the annular surfaces 21, 26 and the interfitting cylindrical surfaces of the ring 25 and the shaft 12. Hence, relative rotation can take place between the shaft 12, the stator 20 and the sealing ring 25 without breaking the seal. However, it is intended that the ring 25 not rotate relative to the stator 20 but simply shift radially on the surface 21 as the sealing ring floats on the rotating shaft 12.

In accordance with the invention, the cup 15 includes a lip 30 generally facing the stator wall surface 21 and dimensioned to permit the sealing ring 25 to be removed from the cup, and a garter spring 31 is interposed between the ring 25 and the lip 30 so as to resiliently urge the surfaces 21, 26 together and releasably secure the sealing ring within the cup. In the illustrated construction, the lip 30 is a continuous annular portion of the cup 15 and is defined by a recess 32 formed about the inside of the cup.

Preferably, the garter spring 31 takes the form of a helical spring having its ends brought together and secured so that the spring is bent into annular form. In the assembled seal, the garter spring 10 is expanded about a retaining ring 33 that is secured around the sealing ring 25. The retaining ring 33 is formed with a gabled outer periphery defining a pair of oppositely sloping, annular camming surfaces 34 and 35.

With the seal 10 assembled, the garter spring 31 bears on the camming surface 35 and tends to contract between the lip 30 and the camming surface so as to urge the sealing ring 25 to the left in FIG. 1. This resiliently holds the surfaces 21, 26 in engagement. In addition, the recess 32 within which the spring 31 is disposed is sufficiently deep to permit the spring to expand and snap over the peak of the gabled retaining ring 33 when the sealing ring 25 is pulled away from the stator 20 and out of the cup 15. The sealing ring can thus be removed for inspection and replacement when that is necessary.

Figure 4:
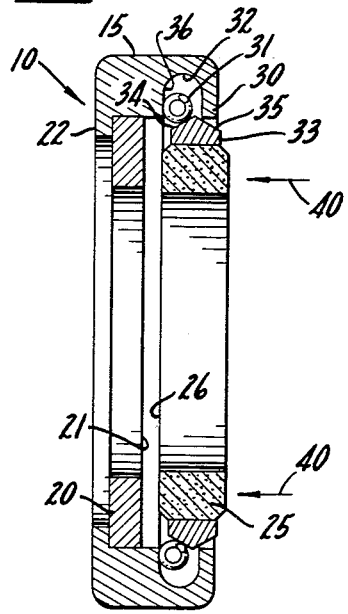
FIG. 4 is a section of the seal shown in FIG. 1 showing a step in the assembly operation.
Figure 3:
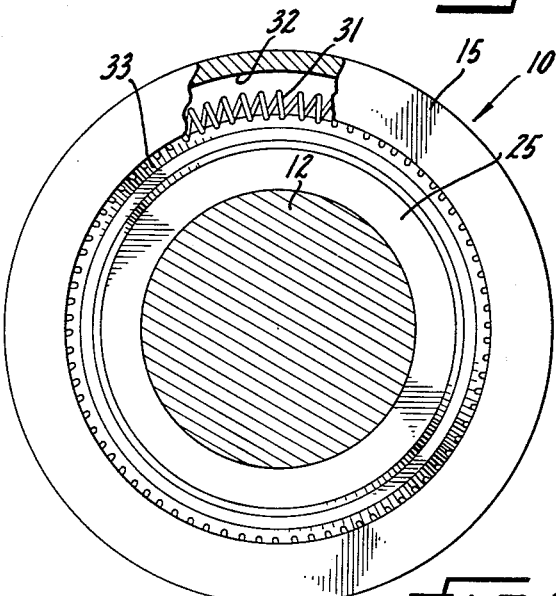
FIG. 3 is an elevation taken approximately along the line 3—3 in FIG. 1.

To facilitate assembly of the seal 10, the recess 32 defines an abutment 36 which faces the lip 30 and limits axial movement of the spring 31 so that forcing the sealing ring 25 and the retaining ring 33 into the cup 15 in the direction of the arrows 40 in FIG. 4, causes the spring 31 to abut the abutment 36, expand against the camming surface 34, and snap over the peak of the retaining ring 33 into engagement with the camming surface 35. Of course, once the spring 31 has snapped over the peak of the retaining ring 33, the parts assume their assembled FIG. 1 positions with the spring being interposed between the lip 30 and the camming surface 35. The garter spring then resiliently urges the surfaces 21, 26 into abutment and releasably holds the sealing ring 25 within the cup 15.

Figure 2:
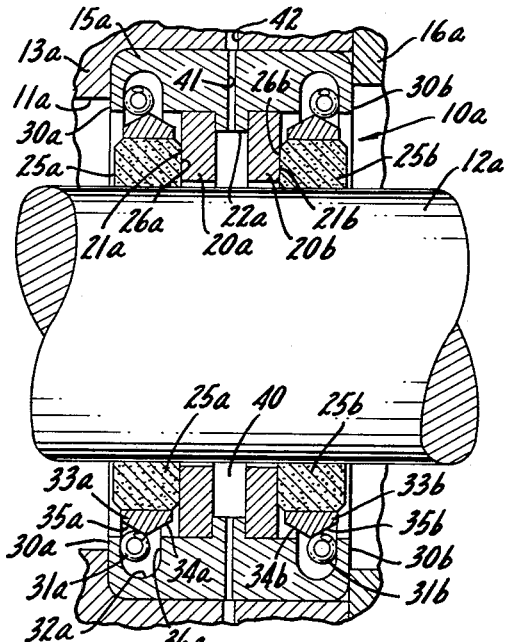
FIG. 2 is a longitudinal section of a shaft assembly showing a modified form of seal also embodying the invention.

Turning to the modification shown in FIG. 2, parts similar to those described in connection with the FIG. 1 modification have been given the same reference numeral with the distinguishing suffixes a or b added. Thus, FIG. 2 illustrates a shaft assembly in which a seal 10a embodying the invention is arranged to restrict leakage along a rotatable shaft 12a through an opening 11a in a housing 13a. The seal 10a includes a housing cup 15a which is firmly held in a seat in the housing 13a by a clamp plate 16a.

The sealing elements of the seal 10a include a pair of stators 20a and 20b defining annular surfaces 21a and 21b, respectively, which are disposed close to the shaft 12a and in planes substantially perpendicular to the axis of the shaft. The stators 20a, 20b are sealed within the cup 15 against a central shoulder 22a formed integrally with the cup.

Cooperating with the stators 20a, 20b are a pair of sealing rings 25a and 25b which are fitted on the shaft 12a and provided with annular surfaces 26a and 26b, respectively, which abut the respective stator surfaces 21a, 21b. The sealing rings 25a, 25b are preferably continuous annuluses formed of carbon.

Secured about the sealing rings 25a, 25b are respective retaining rings 33a and 33b having gabled outer peripheries defining oppositely sloping camming surfaces 34a, 35a and 34b, 35b. The cup 15a is formed with a pair of lips 30a and 30b which face the respective stator surfaces 21a, 21b, and a pair of garter springs 31a and 31b are interposed between the respective lips 30a, 30b and the camming surfaces 35a, 35b of the retaining rings 33a, 33b. The garter springs 31a, 31b are expanded slightly about the retaining rings 33a, 33b so as to resiliently urge the respective sealing rings 25a, 25b toward their adjacent stators as well as releasably hold the sealing rings within the cup 15a.

The lips 30a, 30b are defined by recesses 32a and 32b, respectively, formed in the cup 15a and the recesses are proportioned to define abutments 36a and 36b which allow the sealing rings 25a, 25b to be easily inserted into the cup 15a in the manner illustrated and described in connection with FIG. 4.

It will be readily apparent that, insofar as presently described, the operation and assembly of the seal 10a is substantially identical to that described above in connection with seal 10 with the exception that the seal 10a obviously provides a double sealing action because of the two sealing rings 25a, 25b.

In addition, the seal 10a includes a chamber 40 defined by the annular space between the stators 20a, 20b, and a plurality of passages 41 are formed in the cup 15a so as to provide paths leading to passages 42 formed in the housing 13a. This construction permits the addition of a supply of blocking material, such as an inert gas, through the passages 42, 41 and into the chamber 40 so as to further resist fluid leakage along the shaft 12a. Alternatively, the chamber 40 and the passages 41, 42 can be utilized to drain off gas or fluid leaking past the sealing ring on the pressure side of the seal, thereby minimizing the likelihood of there being leakage through the entire seal 10a.

Those familiar with this art will at once appreciate that the seals 10 and 10a are exceptionally economical to manufacture since they are formed of few parts of quite simple configuration. Moreover, the ease with which the seals 10, 10a can be assembled contributes to manufacturing economy. The fact that the sealing rings can be easily snapped into and out of the seal cups means that inspection and maintenance is greatly facilitated.

The simplicity of the over-all design and of the component parts of the seals 10, 10a further makes possible a very compact construction while utilizing components, in particular the sealing rings 25, 25a, 25b, of sufficient size to perform efficiently.

I claim as my invention:

1. In a shaft assembly having a rotatable shaft passing through a housing, a seal comprising, in combination, an annular cup surrounding said shaft and mounted in said housing, an annular stator sealed within said cup and defining an annular surface closely surrounding said shaft and disposed substantially perpendicular to the axis of the shaft, a sealing ring fitted on said shaft within said cup, said ring having an annular surface abutting said stator wall surface, said cup having a lip generally facing said stator wall surface, a retaining ring secured about said sealing ring, said retaining ring having a camming surface facing said lip and disposed at an acute angle with respect to the axis of said shaft, said lip being spaced from said shaft sufficiently far to permit said sealing ring and retaining ring to be removed from said cup, and a garter spring interposed between said camming surface and said lip so as to resiliently urge said annular surfaces together and releasably secure said sealing ring within said cup.

2. In a shaft assembly having a rotatable shaft passing through a housing, a seal comprising, in combination, an annular cup surrounding said shaft and mounted in said housing, said cup having a stator wall defining an annular surface closely surrounding said shaft and disposed substantially perpendicular to the axis of the shaft, a sealing ring fitted on said shaft within said annular cup, said ring having an annular surface abutting said stator wall surface, said cup having a lip generally facing said stator wall surface and an abutment facing said lip, a retaining ring secured about said sealing ring, said retaining ring having a gabled outer periphery defining a pair of oppositely sloping, annular camming surfaces, said lip being spaced from said shaft sufficiently far to permit said sealing ring and said retaining ring to be removed from said cup, and a garter spring expanded about said retaining ring and interposed between said lip and the adjacent one of said camming surfaces so as to resiliently urge said annular surfaces together and releasably secure said rings within said cup, said abutment being spaced from said stator wall surface so that said sealing and retaining rings can be snapped through said garter spring into said cup.

3. A rotary seal comprising, in combination, an annular cup having a stator wall defining an annular surface lying substantially in a single plane, a sealing ring adapted for mounting on a rotatable member and being disposed within said annular cup, said ring having an annular surface abutting said stator wall surface, said cup having a lip generally facing said stator wall surface, a retaining ring secured about said sealing ring, said lip being dimensioned to permit said sealing ring and said retaining ring to pass said lip and be removed from said cup, said retaining ring having a gabled outer periphery defining a pair of oppositely sloping annular camming surfaces, and a garter spring expanded about said retaining ring and interposed between said lip and the adjacent one of camming surfaces so as to resiliently urge said annular surfaces together and releasably secure said ring within said cup.

4. A rotary seal comprising, in combination, an annular cup having a steel stator wall defining an annular surface lying substantially in a single plane, a carbon sealing ring adapted for mounting on a rotatable member and being disposed within said annular cup, said ring having an annular surface abutting said stator wall surface, said cup having an inner annular recess defining a lip generally facing said stator wall surface and an abutment facing said lip, a steel retaining ring secured about said sealing ring, said lip being dimensioned to permit said sealing ring and said retaining ring to pass said lip and be removed from said cup, and a helical spring bent into annular form and expanded about said retaining ring between said retaining ring and said lip so as to resiliently urge said annular surfaces together and releasably secure said ring within said cup.

References Cited in the file of this patent

UNITED STATES PATENTS 2,251,195    Meunier  ---------------- July 29, 1941

FOREIGN PATENTS 1,040,859    Germany  ---------------- Oct. 9, 1958

UNITED STATES PATENT OFFICE
CERTIFICATE OF CORRECTION

Patent No. 3,154,309                      October 27, 1964

Robert M. Voitik

It is hereby certified that error appears in the above numbered patent requiring correction and that the said Letters Patent should read as corrected below.

In the grant, lines 1 and 2, for "assignor to Continental Illinois National Bank and Trust Company," read -- assignor to Continental Illinois National Bank and Trust Company of Chicago, as Trustee under the Cartridge Type Seal Liquidation Trust, --; lines 11 and 12, for "Continental Illinois National Bank and Trust Company, its successors" read -- Continental Illinois National Bank and Trust Company of Chicago, as Trustee under the Cartridge Type Seal Liquidation Trust, its successors --; in the heading to the printed specification, lines 3 and 4, for "assignor to Continental Illinois National Bank and Trust Company" read -- assignor to Continental Illinois National Bank and Trust Company of Chicago, as Trustee under the Cartridge Type Seal Liquidation Trust --.

Signed and sealed this 13th day of April 1965.

(SEAL)
Attest:

ERNEST W. SWIDER                      EDWARD J. BRENNER
Attesting Officer                   Commissioner of Patents